United States Patent [19]
Kramer, Jr.

[11] 4,023,923
[45] May 17, 1977

[54] BURNER FOR HEATING AN AIRSTREAM

[76] Inventor: Frederick A. Kramer, Jr., 12 Glenview Road, Ladue, Mo. 63124

[22] Filed: Mar. 18, 1975

[21] Appl. No.: 559,514

[52] U.S. Cl. .............................. 432/222; 431/352
[51] Int. Cl.² .......................................... F24H 3/04
[58] Field of Search ........... 431/352; 432/222, 223; 60/39.65

[56] References Cited
UNITED STATES PATENTS

| | | | |
|---|---|---|---|
| 2,665,748 | 1/1954 | Cornelius | 431/352 |
| 3,221,796 | 12/1965 | Nesbitt | 431/352 |
| 3,494,711 | 2/1970 | Spielman | 432/222 |
| 3,614,280 | 10/1971 | Tamio | 431/266 |
| 3,630,499 | 12/1971 | Kramer | 432/222 |
| 3,737,281 | 5/1973 | Guth | 431/352 |
| 3,881,863 | 5/1975 | Creuz | 432/222 |

*Primary Examiner*—Carroll B. Dority, Jr.
*Attorney, Agent, or Firm*—Gravely, Lieder & Woodruff

[57] ABSTRACT

A burner for heating an airstream is disposed in the airstream and has four identical walls which are secured together along their sides to form a tapered combustion chamber, the small end of which is located upstream. An axially extending gas pipe opens into the small upstream end of the combustion chamber and through this pipe a combustible gas enters the combustion chamber. Combustion air from the airstream enters the tapered chamber through apertures in the walls and the mixture so formed is ignited, resulting in a self-sustaining flame. A flame probe, which extends through the axial supply pipe and into the combustion chamber for a substantial distance, senses the flame regardless of whether it is high or low. The combustion chamber walls bulge inwardly intermediate there sides to insure that the combustion air reaches the center of the combustion chamber and mixes thoroughly with the combustible gas. A shroud surrounds the combustion chamber walls and has a metering inlet which opens upstream. The interior of the shroud is pressurized with air from the airstream, and this air enters the combustion chamber through the apertures in the walls thereof.

20 Claims, 8 Drawing Figures

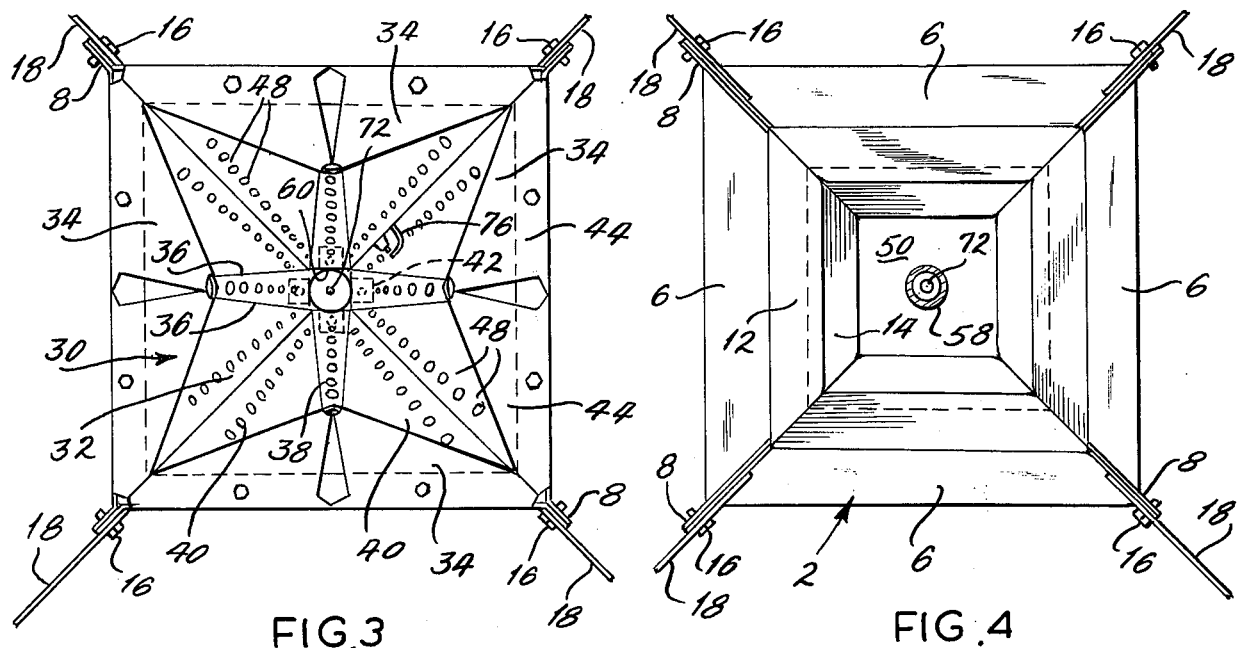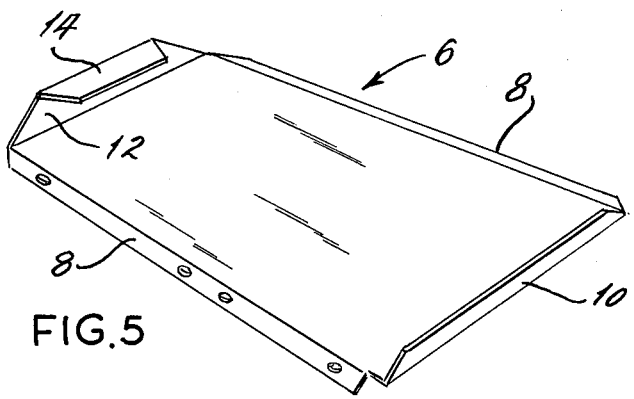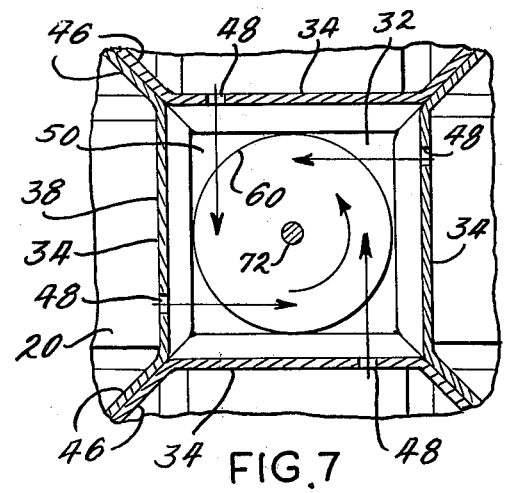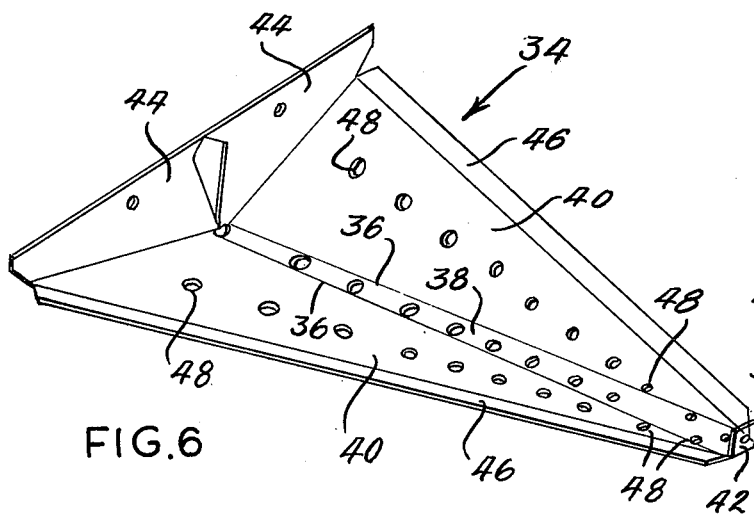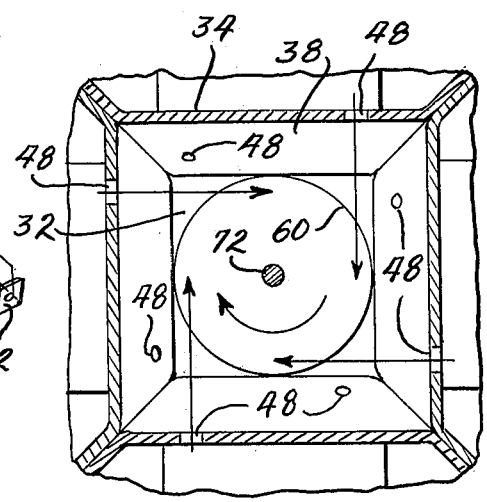

BURNER FOR HEATING AN AIRSTREAM

BACKGROUND OF THE INVENTION

This invention relates in general to burners and more particularly to a gas burner for heating an airstream from within the airstream.

Perhaps the most efficient method of heating an airstream is to maintain combustion directly in the airstream, using the airstream itself for the combustion air. Gaseous fuels such as natural gas are about the only fuels suitable for this purpose since they usually burn completely and leave no residue or other obnoxious products of combustion to contaminate the airstream. However, maintaining a flame in a fast moving and perhaps turbulent airstream is not easily done, and indeed requires special burner configurations. Some of these burners operate only at high flame settings, while others can be turned down, but heretofore the turn down ratio has been relatively modest on the order of about 10:1.

Moreover, in burners having the capability of modulating the flame, sensing the flame has been a troublesome problem because the flame can assume many different positions, depending on the amount of gas introduced into the burner and the turbulence of the combustion air. For example, when the gas supply is turned down to the minimum necessary to sustain the flame, the base of the flame is located just beyond the gas orifice and the flame tip is located not much beyond the base. On the other hand, when the gas supply is at high volume, the base of the flame is located substantially beyond the gas orifice, and the flame possesses considerable length, extending beyond the burner in some instances. The transposition of the flame base at high setting results primarily from the fact that at high setting the gas-air mixture adjacent to the burner is far too rich to support combustion. Only when the gas becomes sufficiently mixed with the air does combustion occur and at high setting this is substantially beyond the burner orifice. Thus, it is difficult to position a flame probe or rod which will sense both high and low flames. In this same vein, the flame will move off of the flame probe, if the burner is over-fired or if there is insufficient combustion air. Of course, a flame probe or rod is necessary to avert the introduction of raw gas into the airstream should the flame become extinguished within the burner.

SUMMARY OF THE INVENTION

One of the principal objects of the present invention is to provide a burner which is disposed in an airstream for the purpose of heating the airstream. Another object is to provide a burner of the type stated which is extremely simple in construction and inexpensive to manufacture. A further object is to provide a burner of the type stated which has an extremely high turndown ratio. An additional object is to provide a burner of the type stated which is a single flame probe capable of sensing high and low flames. Still another object is to provide a burner of the type stated which will operate in a high velocity and turbulent airstream. These and other objects and advantages will become apparent hereinafter.

The present invention is embodied in a burner having means defining a tapered combustion chamber and having apertures therein for admitting air to the combustion chamber. It also includes a tapered combustion chamber having a flame rod projected axially into it through the gas supply means. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 3 is an elevational view of the downstream end of the burner;

FIG. 4 is an elevational view of the upstream end of the burner;

FIG. 5 is a perspective view of one of the shroud plates used in the shroud for the burner;

FIG. 6 is a perspective view of one of the combustion chamber plates used in the combustion chamber assembly of the burner;

FIG. 7 is a sectional view taken along line 7—7 of FIG. 2 and showing the disposition of the first set of apertures in the combustion chamber plates and the air swirl created thereby; and FIG. 8 is a sectional view taken along line 8—8 of FIG. 2 and showing the disposition of the second set of apertures in the combustion chamber plates and the air swirl created thereby.

DETAILED DESCRIPTION

Figure 1:
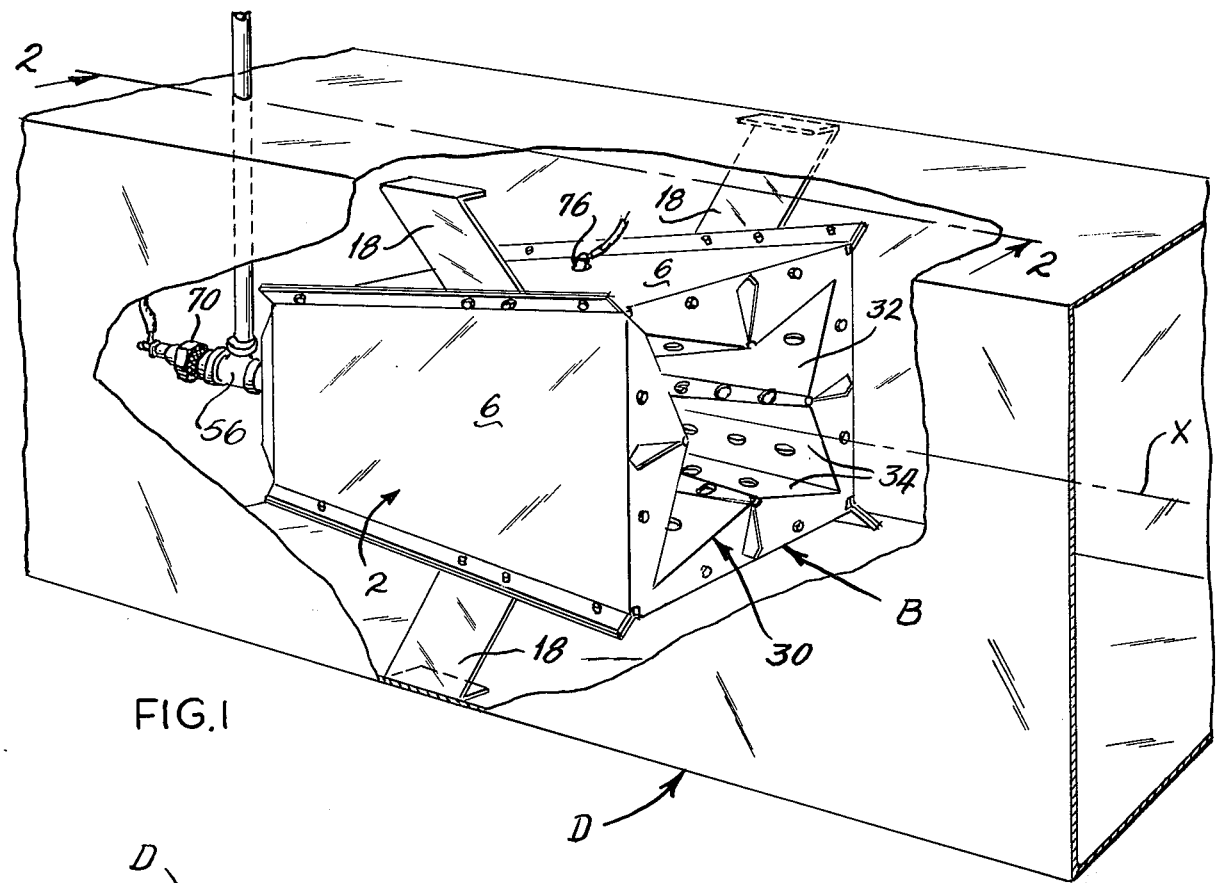
FIG. 1 is a perspective view of the burner of the present invention installed in a duct.

Referring now to the drawings (FIG. 1), B designates a burner which is disposed in a duct D through which air passes. The airstream within the duct D is created by a fan (not shown) which may be either upstream or downstream from the burner B with the former being preferred. The burner B possesses a four-sided external configuration which is radially symmetrical about its longitudinal axis X (FIGS. 1 and 2) and is slightly tapered with the large end of the taper being downstream from the small end.

The burner B includes a housing or shroud 2 which forms its exterior and possesses the four-sided tapered configuration. At its one end the shroud 2 has a square air metering inlet 4 (FIGS. 2 and 4) which opens upstream so that a metered flow of air from the airstream is directed into the shroud. The shroud 2 consists of four identical walls or shroud plates 6 which are joined together along their side edges.

Each shroud plate 6 (FIG. 5) has side margins and along these margins it is provided connecting flanges 8 which are directed outwardly at 45° with respect to the major surface area of the plate 6. At its large or downstream end the plate 6 has an inwardly directed front flange 10 which is almost perpendicular to the main body of the plate 6. On the other hand, the upstream end of the plate 6 turns inwardly at about 45° to form a rear wall segment 12, and then turns forwardly to form an inlet wall segment 14. The plate 6 is formed in a simple stamping operation.

The four shroud plates 6 are fitted together with the connecting flanges 8 of adjacent plates 6 being in facewise abutment (FIGS. 3 and 4). Indeed, the abutting flanges 8 are secured together by self-tapping screws 16 which pass through the connecting flange 8 of one plate 6 and thread into the connecting flange 8 on the other plate 6. The end wall segments 12 of the four connected plates 6 all face upstream and have their end edges in abutment, thus forming the rear wall of the shroud 2 (FIG. 4). The inlet wall segments 14 likewise have their end edges in abutment, and these segments define the air metering inlet 4 at the upstream end of the shroud 2. Since the inlet wall segments 14 are disposed at an angle with respect to the longitudinal axis X of the burner B, the metering inlet 4 has a funnel-shaped configuration. Secured to the outwardly directed connecting flanges 8 along the sides of the shroud 2 are mounting brackets 18 which project away from the housing 2 and are attached to the duct D at their outer ends. The brackets 18 support the burner B within the duct D and enable the airstream to pass by each side of the burner B.

The shroud 2 creates an air chamber 20 around a combustion chamber assembly 30 (FIG. 2) which is housed therein, and the combustion chamber assembly 30 in turn contains a tapered combustion chamber 32. The taper of the combustion chamber 32 is in the same direction as the taper on the shroud 2, but is substantially greater. In particular, the combustion chamber 32 is square in cross-section at its upstream end (FIGS. 3, 7 and 8) and is just large enough to accommodate the flow of a combustible gas into the chamber. The downstream end on the other hand is shaped in the configuration of a four-pointed star (FIG. 3) with the points of the star being extended out almost as far as the side corners on the shroud 2. At any point along the longitudinal axis X, the combustion chamber 32 is radially symmetrical about the axis X. The combustion chamber assembly 30 consists of four identical walls or plates 34, sometimes called air metering plates, which are joined together along their sides.

Each plate 34 (FIG. 6) through its center has a pair of break or fold lines 36 which converge toward the downstream end of the plate 34 where they are quite close together. The break lines 36 divide the plate 34 into a narrow center section 38 and a pair of triangular side sections 40. Each of the sections 38 and 40 is planar and the side sections 40 are disposed at a slight angle with respect to the plane of the center section 38. This angle is great enough to impart a convex or bulged appearance to one face of the plate 34, and it is this face which is presented toward the combustion chamber 32. The center section 38 has its greatest width at its upstream end and indeed the width of the center section 38 at this point equals the width of the upstream end for the combustion chamber 32. The side sections 40, on the other hand, have their greatest width at the downstream end of the plate 34. At its upstream end the center section 38 merges into an outwardly directed mounting tab 42. The side sections 40 at their downstream ends merge into outwardly directed front flanges 44 and the outer margins of the two flanges 44 for each plate 34 are parallel to the plane of the center section 38. Along their side edges the side sections 40 have outwardly directed connecting flanges 46 which are disposed at about 45° with respect to the plane of the center section 38.

The center section 38 and two side sections 40 of each combustion chamber plate 34 are provided with air inlet apertures 48 which are arranged in rows along the centers of the respective sections 38 and 40, except at the upstream end of the plate 34. The apertures 48 in each row are smallest at the upstream end and become progressively larger toward the downstream end. Moreover, the apertures 48 in the center section are staggered in the longitudinal direction with respect to the apertures 48 in the two side sections 40. At the upstream end of the plate 34 where the center section 38 is widest and constitutes almost the entire width of the combustion chamber 32, the apertures 48 are not arranged in rows, but instead are alternated generally from one side of the plate 34 to the other. For example, the aperture closest to the baffle plate 50 is located in the center section 38 adjacent to one break line 36, while the second aperture is located in the center section 38 adjacent to the other break line 36. The third aperture 48 is likewise located in the center section adjacent to the break line 36 along which the first aperture is disposed. However, the fourth aperture 48 is located in the side section 40 along the break line 36 which passes by the second aperture while the fifth aperture 48 is located in the other side section 40. Thereafter, the apertures fall into the three rows previously discussed. Like the shroud plates 6, the combustion chamber plates 34 are completely formed in a simple stamping operation.

The four combustion chamber plates 34 are fitted together into a four sided configuration in which the bulges in the plates 34 are directed inwardly and the connecting flanges 46 on adjacent plates 34 are in abutment and are directed outwardly. The abutting flanges 46 are joined permanently together by spot welding or other suitable means. The volume enclosed by the four joined plates 34 constitutes the combustion chamber 32 which at its upstream end is square in configuration and on each side is bordered only by the center section 38 of one of the metering plates 34, and at its downstream end possesses the configuration of a four-pointed star (FIG. 3). The combustion chamber 32 communicates with the air chamber 20 through the apertures 48 in the combustion chamber plates 34 (FIG. 2).

Figure 2:
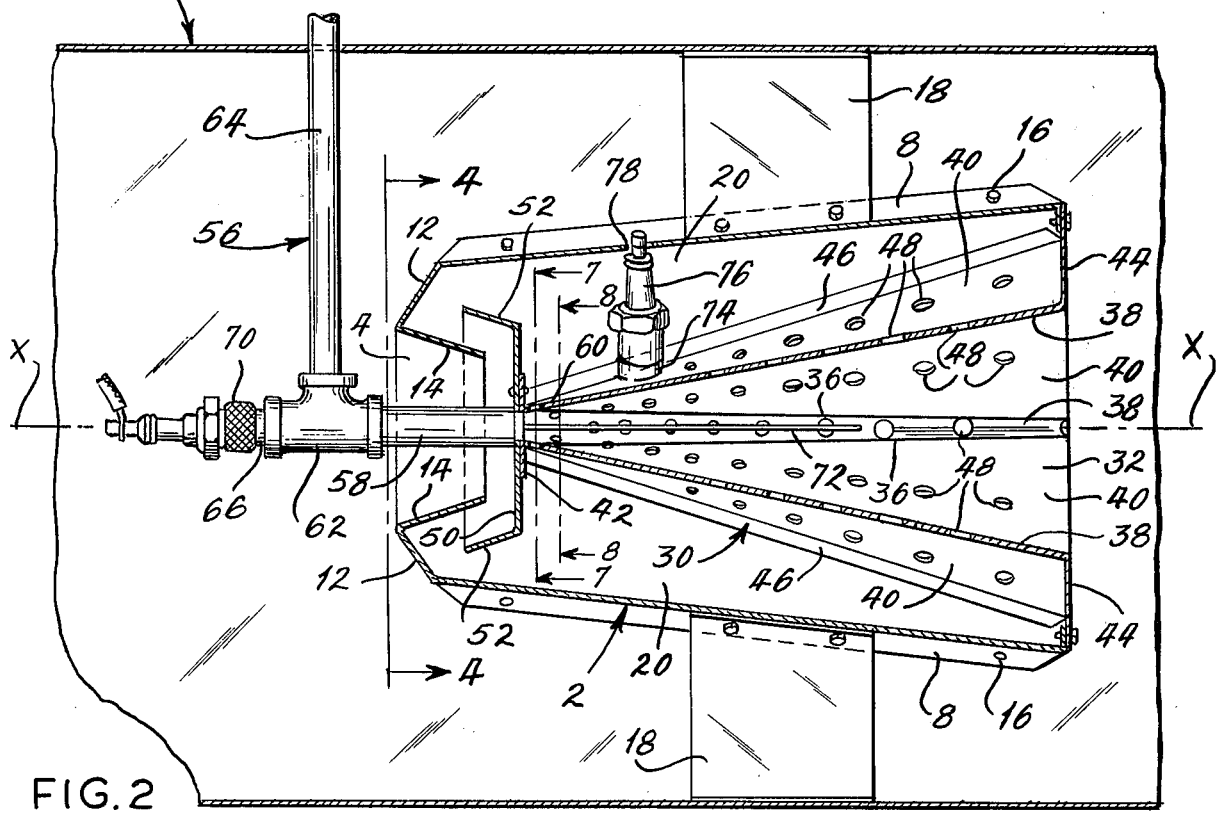
FIG. 2 is a longitudinal sectional view of the burner taken along line 2—2 of FIG. 1.

The outwardly directed front flanges 44 on the plates 34 of the combustion chamber assembly 30 overlie the inwardly directed front flanges 10 on the shroud plates 6 of the shroud 2 and the abutting flanges 44 and 10 are secured firmly together by screws which pass through the former and thread into the latter (FIG. 2). The colinear outer margins on the two flanges 44 for each plate 34 lie along the forward margins of the shroud plates 4 and like the shroud plates 4 define a square.

The outwardly directed mounting tabs 42 at the upstream end of the combustion chamber assembly 30 lie against and are riveted to a baffle plate 50 (FIG. 2) which is disposed directly beyond the air inlet opening 4. The baffle plate 50 has rearwardly directed flanges 52 which are spaced outwardly from the inlet wall segment 14 of the shroud 2, but have their rear margins located behind the forward margins of the inlet wall segments 14. Thus, the metered air entering the inlet 4 impinges against the baffle plate 50 where it is diverted rearwardly through the space between the wall segments 14 on the shroud plate 6 and the flanges 52 on the baffle plate 50. Thereafter, the air turns forwardly and flows through the air chamber 20 of the shroud 2. The baffle plate 50 and the changes of direction created thereby eliminates turbulence from the incoming air so that the air passes through the air chamber 20 as an evenly distributed, yet pressurized, flow. The baffle plate 50 is also a simple metal stamping.

Combustible gas is supplied to the upstream end of the combustion chamber 32 through a gas line 56 (FIG. 2) including an axial pipe 58 which is coaxial with the longitudinal axis X of the burner B and is brazed or otherwise firmly secured at its forward end to the baffle plate 50. In this regard, the baffle plate 50 is provided with an aperture 60 which is equal in size to the inside diameter of the pipe 58, and that diameter is slightly less than the width of the combustion chamber 32 at its upstream end. The aperture 60 is centered in the plate 50 and opens into the upstream end of the combustion chamber 32. The axial pipe 58 projects rearwardly through the air inlet opening 4, and beyond the opening 4 is connected with a tee 62 which is threaded over it. Threaded into the lateral branch of the tee 62 is a lateral pipe 64 which in turn is connected through a shutoff valve (not shown) and a modulating valve (not shown) to a supply of a suitable combustible gas such as natural gas.

The remaining axial branch of the tee 64 has a bushing 66 (FIG. 2) threaded into it and threaded into the bushing 66 is an insulative base 70 from which a flame probe or rod 72 projects. The rod 72 extends through the tee 62, the axial pipe 58, and into the combustion chamber 32 without contacting any of the metal parts surrounding it. Indeed, the rod 72 is electrically isolated from the remainder of the burner B by the insulative base 70. The rod 72 forms part of an electrical circuit which controls the shutoff valve through which gas is supplied to the gas line 56. When a flame impinges against the rod 72, the circuit will permit the shutoff valve to remain open. However, should the flame extinguish, the rod will sense its absence, and the electrical circuit will close the shutoff valve so that raw gas does not enter the airstream. Burner control circuits which use flame rods or probes are conventional, and hence the circuitry will not be disclosed in detail.

One of the combustion chamber plates 34 is fitted with a bushing 74 into which a spark plug 76 is threaded. The bushing 74 is located close to the small upstream end of the combustion chamber 30 so that the electrodes of the spark plug 74 are exposed to the combustion chamber near the gas inlet aperture 60. The shroud plate 6 which is located directly outwardly from the bushing 74 is provided with an aperture 78 to afford access to the spark plug 76.

OPERATION

The burner B, being located within the duct D (FIGS. 1 and 2), is in the airstream flowing through the duct D. At the burner location most of the air flows to the side of the shroud 2, but some of the air enters the air metering inlet 4 so that a metered flow of air is directed into the air chamber 20. This metered flow comes against the baffle plate 50, changes direction, and flows rearwardly through the space between the inlet wall segments 14 on the shroud 2 and the flanges 52 on the baffle plate 50. The rearwardly flowing air enters the large interior of the air chamber 20 located between the shroud 2 and the combustion chamber assembly 30, where it changes direction again and flows forwardly. The change in direction at the baffle plate 50 eliminates turbulence from the air within the air chamber 20 so that the air passes through the chamber 20 in a smooth gentle flow. The air within the air chamber 20 nevertheless remains pressurized, and the pressurized air discharges into the combustion chamber 32 through the apertures 48.

To heat the airstream, the combustible gas is supplied to the gas line 56 initially at a relatively low flow rate, and this gas enters the combustion chamber 32 through the inlet aperture 60 in the baffle plate 50. Upon entering the combustion chamber 32 the gas immediately mixes with the air entering the chamber 32 through the apertures 48 located closest to the baffle plate 50. In this regard, it should be noted that the apertures 48 of the first set, that is the four apertures 48 located closest to the plate 50, are offset from the center lines of their respective plates 34 to the same side of those center lines. This generates an air swirl which surrounds the gas inlet aperture 60 (FIG. 7). The air inlet apertures 48 of the second set are likewise offset from the center lines of their respective plates 34, but to the opposite sides of those center lines. This creates an air swirl in the opposite direction (FIG. 8). The apertures of the third set are offset to the same side as the first while the fourth are offset to the same side as the second. The end result is several layers of counter-rotating air currents which create considerable turbulence in the upstream end of the combustion chamber 32. This turbulence causes a thorough mixing of the gas and air in the small upstream end of the combustion chamber.

As the gas flows into the combustion chamber 32, a spark is created at the spark plug 76 and this spark ignites the mixture of gas and air at the upstream end of the combustion chamber and a self-sustaining flame develops. This flame heats the airstream in the duct D.

At low gas settings the flame is confined to the narrow upstream end of the combustion chamber 32. However, as the gas flow increases, more air is necessary to support combustion and the flame moves downstream toward the large end of the combustion chamber. The inward disposition of the center sections 38 of the combustion chamber plates 34 and the presence of apertures 48 in those sections insures a thorough mixing of the gas and air in the enlarged downstream end. Indeed, the convex shapes or bulges in the plates 34 tend to crowd the combustion air into the center of the combustion chamber 32. Moreover, the introduction of combustion air on all four sides of the flame tends to envelope the flame in a cool jacket of air which prevents excessive heating of the plates 34 forming the combustion chamber assembly 30. This is in contrast to conventional burners where the flames impinge against the end walls and heat those walls to extremely high temperatures.

The break lines 36 and the angular disposition of the triangular side sections 40 on each plate accommodate differential expansion between the plates 34 and the surrounding shroud 2 and prevent warpage due to the thermal expansion of the plates 34.

The burner B is capable of maintaining extremely small as well as large flames. In other words, it has a high turn down ratio, and this ratio is on the order of 50:1.

The flame rod 72 extends along the longitudinal axis X of the burner and is heated by both large and small flames. Thus, the single rod 72 is suitable for sensing flames throughout the heating range for the burner B. If the flame becomes too large, its base will move beyond the downstream end of the flame rod 72, and hence the flame rod 72 may also be used as a limit device for shutting off the gas supply to prevent excessive heating.

The burner B may derive its combustion air from a source other than the airstream in the duct D. For example, a fan located externally of the duct D may be connected to the shroud 2 through a small supply duct.

This invention is intended to cover all changes and modifications of the example of the invention herein chosen for purposes of the disclosure which do not constitute departures from the spirit and scope of the invention.

What is claimed is:

1. A burner for heating an airstream, said burner being disposed in the airstream and comprising: a plurality of chamber walls joined together along their sides to form a combustion chamber having a longitudinal axis oriented generally parallel to the direction of flow for the airstream, each of the walls being closest to the longitudinal axis at the upstream end of the combustion chamber and diverging from the longitudinal axis thereafter so that each wall is located further from the longitudinal axis at the downstream end of the combustion chamber, each of the walls having apertures therein for admitting air into the combustion chamber, each of the walls intermediate its sides bulging inwardly toward the longitudinal axis with the bulges so formed being located at and leading up to the downstream end of the combustion chamber and further becoming more pronounced toward the downstream end, at least some of the apertures being in the bulges; and supply means opening into the small upstream end of the combustion chamber for introducing a combustible substance into the combustion chamber, whereby the combustible substance and the air will mix and when ignited will burn in the combustion chamber.

2. A burner according to claim 1 wherein combustible substance is in a gaseous state and the supply means is a pipe which opens into the small upstream end of the combustion chamber, the portion of the pipe opening into the upstream end of the combustion chamber being coaxial with the longitudinal axis of the combustion chamber; and wherein the gas flows into the combustion chamber parallel to the longitudinal axis.

3. A burner according to claim 2 wherein there are four chamber walls, and the walls are of identical size and shape.

4. A burner according to claim 1 and further comprising a shroud surrounding the chamber walls so as to form an air chamber around the outwardly presented surfaces of the walls, the air chamber communicating with the combustion chamber through the apertures in the walls, the shroud having an inlet opening which faces upstream so that air from the airstream will enter the air chamber through the inlet opening.

5. A burner according to claim 4 wherein the inlet opening is located directly behind the upstream end of the combustion chamber, and the supply means is a pipe which extends through the inlet opening and thereafter opens into the combustion chamber.

6. A burner according to claim 2 and further comprising a flame sensing probe supported on the supply pipe and extended axially through the supply pipe and into the upstream end of the combustion chamber a sufficient distance to enable it to be heated by and to sense both high and low flames.

7. A burner according to claim 6 wherein the flame sensing probe is electrically isolated from the supply pipe and the chamber walls.

8. A burner according to claim 1 wherein the apertures in the walls at the upstream end of the combustion chamber are in sets which are located progressively further from the end of the supply means, the apertures of each set being offset from the centers of their respective walls in the same direction so that the air introduced through them tends to swirl in the upstream end of the combustion chamber.

9. A burner according to claim 8 wherein the apertures of successive sets are offset in opposite directions so as to create counter-rotating swirls in the upstream end of the combustion chamber.

10. A burner according to claim 4 wherein the shroud has an inlet which opens upstream into the airstream, the inlet restricting the amount of air entering the shroud so as to provide a generally metered flow of air to the air chamber.

11. A burner according to claim 10 and further comprising a baffle located within the shroud beyond the inlet, the baffle being positioned to change the direction of the metered flow and to substantially eliminate turbulence therefrom.

12. A burner according to claim 1 wherein the chamber walls are configured such that the combustion chamber is radially symmetrical about its longitudinal axis.

13. A burner according to claim 1 wherein the downstream end of the combustion chamber is unobstructed such that it opens into the airstream over its entire cross-sectional area.

14. A burner for heating an airstream, said burner being disposed in the airstream and comprising: wall means defining a tapered combustion chamber having a longitudinal axis extending generally in the direction of the airstream, the combustion chamber being radially symmetrical about the longitudinal axis and having its small end presented upstream, the wall means having inwardly directed bulges at and leading up to its downstream end with the bulges becoming more pronounced toward the downstream end so as to reduce the cross-sectional area of the downstream end to less than that of a similar cross-sectional configuration without the bulges, the wall means having apertures therein for admitting air from the airstream to the combustion chamber with some of the apertures being located in the inwardly directed bulges, whereby the bulges in combination with the apertures therein crowd the air toward the center of the combustion chamber; and supply means connected to a source of combustible gas and to the small end of the combustion chamber for introducing the combustible gas into the combustion chamber at the small end of the chamber.

15. A burner for heating an airstream, said burner being disposed in the airstream and comprising: four walls of identical size and shape joined together along their sides to form a combustion chamber having a longitudinal axis oriented generally parallel to the direction of flow for the airstream, each of the walls being closest to the longitudinal axis at the upstream end of the combustion chamber and diverging from the longitudinal axis thereafter so that each wall is located further from the longitudinal axis at the downstream end of the combustion chamber, the upstream end of the combustion chamber being square in cross-section and the walls downstream therefrom bulging inwardly intermediate their sides such that the downstream end of the combustion chamber in cross section resembles a four-pointed star, the walls having apertures therein for admitting air into the combustion chamber with some of the apertures being in the bulged portions of the sidewalls; and a supply pipe opening into the small upstream end of the combustion chamber for introducing a combustible substance in a gaseous state into the combustion chamber, the portion of the pipe opening into the upstream end of the combustion chamber being coaxial with the longitudinal axis of the combustion chamber such that the gas flows into the combustion chamber parallel to the longitudinal axis, whereby the combustible substance and the air will mix and when ignited will burn in the combustion chamber.

16. A burner for heating an airstream, said burner being disposed in the airstream and comprising: a plurality of walls joined together to form a combustion chamber which diverges from its upstream end to its downstream end and has a longitudinal axis which extends from one end to the other parallel to the direction of flow for the airstream, the upstream end of the combustion chamber being generally square in cross-section; the walls having apertures therein; a shroud surrounding the combustion chamber walls and forming an air chamber around the combustion chamber with the air chamber being in communication with the combustion chamber through the apertures in the walls; means for directing air into the air chamber of the shroud so that the air will flow into the combustion chamber through the apertures; and a gas supply pipe opening into the combustion chamber at the upstream end thereof and in close proximity to the chamber walls where the walls form the generally square cross-sectional shape, the pipe having its axis coincident with the longitudinal axis of the combustion chamber; the apertures in the walls at the upstream end of the combustion chamber being arranged in sets which are located progressively farther from the end of the supply pipe, each having four apertures, there being a different aperture of the set along each of the four sides of the square cross-sectional shape, the apertures of each set being offset in the same direction with respect to the longitudinal axis of the combustion chamber such that the air introduced through them tends to swirl about the longitudinal axis, some of the sets being offset in one direction and other sets being offset in the opposite direction so as to create counter-rotating swirls in the upstream end of the combustion chamber, whereby gas from the gas supply pipe mixes thoroughly with the air discharged from the apertures at the upstream end of the combustion chamber.

17. A burner according to claim 16 wherein the apertures of successive sets are offset in opposite directions.

18. A burner according to claim 14 wherein the supply means comprises a supply pipe connected with a source of combustible material and opening into the small upstream end of the combustion chamber such that the combustible material is directed into the combustion chamber generally along the longitudinal axis and mixes with the air to form a combustible mixture; and wherein the burner further comprises a straight flame sensing probe extending through the supply pipe and into the combustion chamber generally along the longitudinal axis of the combustion chamber, the flame sensing probe projecting toward the downstream end of the combustion chamber and being exposed to the interior of the combustion chamber at the small upstream end as well as a substantial distance beyond the upstream end so as to be able to sense larger flames which are located substantially away from the end of the supply pipe and smaller flames which are located near the supply pipe.

19. A burner according to claim 18 wherein the supply pipe includes an axial portion which opens into the upstream end of the combustion chamber and extends generally parallel to the airstream; and wherein the flame probe extends through the axial portion of the pipe.

20. A burner according to claim 19 wherein the supply pipe further includes a lateral portion disposed at an angle with respect to the axial portion and a T-fitting connecting the lateral and axial portions, the flame probe being supported on the T-fitting.

* * * * *